Nov. 15, 1938.    R. W. GILBERT    2,136,682
AUTOMATIC CONTROL SYSTEM
Filed Jan. 8, 1936    6 Sheets-Sheet 1

INVENTOR
R. W. GILBERT
BY
ATTORNEYS

Nov. 15, 1938.   R. W. GILBERT   2,136,682
AUTOMATIC CONTROL SYSTEM
Filed Jan. 8, 1936   6 Sheets-Sheet 2

INVENTOR
R. W. GILBERT
BY
ATTORNEYS

Nov. 15, 1938.     R. W. GILBERT     2,136,682
AUTOMATIC CONTROL SYSTEM
Filed Jan. 8, 1936     6 Sheets-Sheet 5

INVENTOR
R. W. GILBERT
BY
ATTORNEYS

Nov. 15, 1938.  R. W. GILBERT  2,136,682
AUTOMATIC CONTROL SYSTEM
Filed Jan. 8, 1936  6 Sheets-Sheet 6

INVENTOR
R.W.GILBERT
BY
Ward, Crosby + Ward
ATTORNEYS

Patented Nov. 15, 1938

2,136,682

UNITED STATES PATENT OFFICE 2,136,682

AUTOMATIC CONTROL SYSTEM

Roswell Ward Gilbert, East Orange, N. J., assignor to Weston Electrical Instrument Corporation, Newark, N. J., a corporation of New Jersey Application January 8, 1936, Serial No. 58,134

19 Claims. (Cl. 236—69)

This invention relates to electrically actuated control apparatus for effecting automatic regulation of variable quantities susceptible to electrical interpretation, for example, in terms of a current, voltage or resistance, such as the temperature in a heating system, the current, voltage or power in an electrical system, the hydrogen ion concentration or pH in a chemical system, and the like.

An object of the invention is to provide apparatus of the character referred to which exerts continuous control over the quantity to be regulated in contrast to the intermittent or step by step regulation of known systems, such as those employing relays; and which in response to deviation of said quantity from a chosen value or setting provides continuous and automatic adjustment of the quantity to said value. Preferably, the adjustment is effected at a continuously decreasing rate, thereby to prevent transient overadjustment of the quantity with respect to the chosen value, such as would occur in a damped oscillatory approach thereto.

Although the control apparatus of the invention responds practically instantaneously to a deviation of the controlled quantity from the chosen value, to restore the quantity to said value, and hence of itself is substantially free from oscillatory characteristics, the system under control may inherently introduce an appreciable time delay between operation of the control apparatus and readjustment of the controlled quantity, with resulting oscillatory tendencies. This condition is apt to occur in automatic temperature control, wherein although the control apparatus responds immediately to temperature variation to adjust the caloric output of a heating unit in such manner as to readjust to the chosen temperature, nevertheless, delay is encountered in reestablishing the chosen temperature, the extent of which depends on the thermal capacity of the system. Delay of this character is conducive to damped oscillatory adjustment of the controlled quantity to the chosen condition.

A feature of the invention resides in the provision of means for eliminating this condition irrespective of the delay occurring between regulating adjustment of the control apparatus and resulting establishment of the chosen value of regulation, the means in question being adapted to impart critical overall damping to the system, whereby the controlled quantity is adjusted to chosen value at a continuously decreasing rate to provide an asymptotic or logarithmic approach thereto.

By incorporation of the critical overall damping referred to, the control system of the invention provides the maximum speed of control for any given system to be regulated irrespective of the time delay inherent therein.

In my application Serial No. 530, filed January 5, 1935, now Patent No. 2,059,786, of which this application is a continuation in part, I have disclosed a system employing a photoelectrically balanced electrical bridge controlling the space current of a grid-controlled space discharge device for automatically adjusting a voltage or current to a condition of extremely precise equilibrium or balance with a second voltage or current, the balance being effected in a balancing circuit which in turn determines the condition of balance in the bridge whereby the bridge and the balancing circuit are automatically adjusted to a condition of balance in continuous and mutually controlling gradations. Inasmuch as the system operates on the principle of a potentiometric balance, I refer to it herein as a photoelectric potentiometer.

With the photoelectric potentiometer employed for purposes stated in my parent application aforesaid, balance is achieved between a voltage or current derived from the voltage drop across a resistance traversed by the space current referred to, and a voltage or current source subject to variation, such as a voltage or current obtained from a pH cell, or from a thermocouple or photocell exposed to temperature or radiant energy fluctuations, the magnitude of space current required to effect the balance serving as a measure of the pH, temperature, radiant energy, etc.

Whereas therefore in my parent application the photoelectric potentiometer of my invention is applied essentially as a device for measuring or recording the magnitude of a physical quantity susceptible to electrical interpretation, I have discovered that when appropriately combined with suitably chosen additional elements, it may be employed to regulate automatically to a chosen value, in a manner constituting the subject matter of this application, the magnitude of such a quantity in response to deviations thereof from the value chosen.

In adapting the bridge to such automatic regulation, the quantity to be regulated is electrically interpreted in terms of a current, voltage or resistance, thereby to provide a correspondingly varying current or voltage which is opposed in the balancing circuit to a fixed current or voltage determinative of the chosen value of regulation and properly selected as to magnitude to that end. The quantity to be controlled is, moreover, rendered continuously adjustable under control of the space current of the bridge-controlled space discharge device, in such manner as to effect a compensative alteration of said quantity in accordance with the magnitude and polarity of unbalanced current flow in the balancing circuit due to deviation of said quantity from the chosen value, thereby automatically to adjust the same to the value chosen, and concurrently to adjust the balancing circuit to a condition of balance in continuous and mutually controlling gradations.

In the drawings:

Fig. 1 illustrates diagrammatically the photoelectric potentiometer as applied to electrical current regulation; while

Figs. 3 to 6 illustrate various applications to temperature control by employment of a thermocouple for introducing into the potentiometer balancing circuit, a voltage indicative of the temperature to be regulated.

Figure 1:
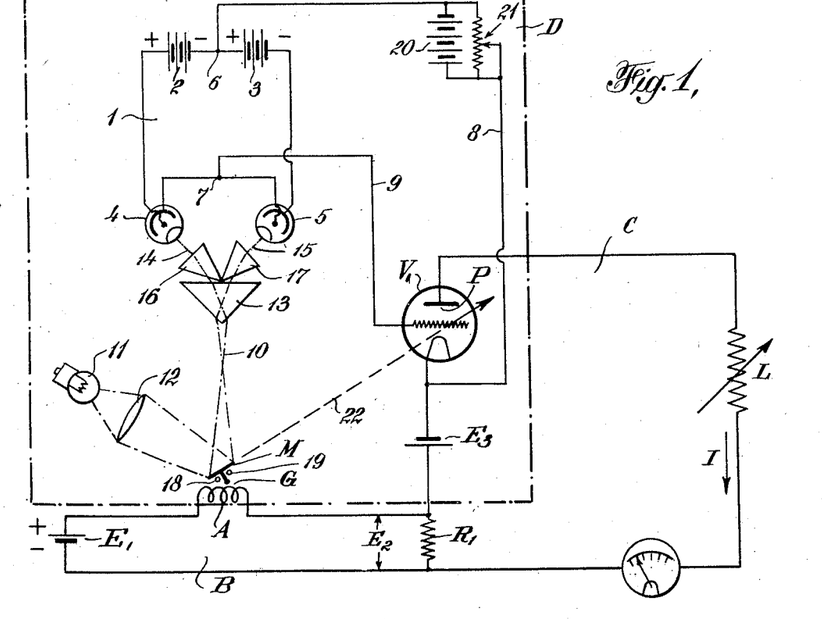

Referring to the current regulating system of Fig. 1, there is shown an electrical bridge I consisting of batteries 2, 3, comprising adjacent balancing arms of fixed voltage ratio, connected in series with the current paths of a pair of photoelectric tubes 4, 5, the latter comprising adjacent balancing arms of variable voltage ratio. The conjugate points 6, 7 of the bridge are connected by conductors 8 and 9 to the cathode and grid respectively of a grid-controlled space discharge device $V_1$, such as a thermionic tube.

A circuit C, extending from cathode to anode of tube $V_1$, contains in series: the space path resistance P of tube $V_1$, a load resistance L subject to variation, a balancing circuit B, comprising a fixed resistance $R_1$ connected in parallel through an actuating coil A of a galvanometer G with a fixed voltage $E_1$ determinative of the standard value to which the current in load L is to be regulated, and a plate battery $E_3$. Galvanometer G is provided with a freely supported movable element or mirror M which is deflectable from the median setting shown through an angle varying in magnitude and direction with the magnitude and polarity of current in the actuating coil A, variably directs a beam 10 from a light source 11, focused by lens 12, onto the apex of a prism 13. Prism 13 splits the incident beam 10 into a pair of emergent beams 14, 15 adjustably directed respectively by the auxiliary prisms 16, 17 onto the photoelectric elements 4, 5. A pair of stops 18, 19 are provided for confining the mirror deflection in each direction within limits corresponding to maximum or full illumination of one photoelectric element and concurrent minimum or substantially zero illumination of the other.

An adjustable biasing voltage for the grid of tube $V_1$ may, if desired, be had by connecting a voltage source 20, shunted by a potentiometer 21, in series with conductor 8, as shown.

For proper operation of the system, the voltage $E_1$ is poled in opposition to the voltage $E_2$ due to the flow in resistance $R_1$ of the space current I of tube $V_1$ which is also the current traversing load L.

Current I is subject to variation with variation in the load resistance L. In order, however, for a condition of balance to exist in the balancing circuit B the voltage $E_2$ across resistance R must equal $E_1$, or:

(1) $$E_1 = E_2 = I_B R$$

where $I_B$ represents the magnitude of current I achieving the balance. Only for this condition of balance will the current in the galvanometer coil A be zero. For all other values of the current I voltage $E_2$ will be greater or less than $E_1$, so that a voltage difference will exist between the terminals of coil A producing a flow of current therein of such magnitude and polarity as to return circuit B to the condition of balance by so altering the plate resistance P of tube $V_1$ as to compensate for the alteration in the load resistance L which produces the condition of unbalance.

Should, for example, the load resistance L increase from a value achieving the condition of balance in circuit B to decrease the plate current I, the voltage $E_2$ in the balancing circuit will decrease below $E_1$ to produce a flow of unbalanced current in the galvanometer coil A having the conventional direction from $E_1$ to $E_2$. For proper operation, coil A is so connected in circuit B that a flow of unbalanced current from $E_1$ to $E_2$ will produce a rotation of mirror M in a clockwise direction, thereby increasing the illumination of photoelectric element 4, while decreasing that of element 5 proportionately. The resistance of element 5 will thus increase while that of element 4 will decrease, causing the potential of conjugate point 7 to assume an increasingly positive potential with respect to conjugate point 6, thereby to increase in a positive direction the grid voltage applied to tube $V_1$. The space path resistance P of tube $V_1$ will therefore decrease with continued clockwise rotation of mirror M and thus produce an increase in the space current I until the voltage $E_2$ due to the flow of current I through resistance $R_1$ reassumes a magnitude equal to voltage $E_1$, whereupon the unbalanced current flow in circuit B will be reduced to zero and mirror M left in the position to which it has been thus rotated, due to its freely pivoted mounting.

If now the load resistance L increases further, the process above described will be repeated and mirror M rotated still further in a clockwise direction until a new condition of balance obtains. On the other hand, if the load resistance L should decrease to increase current I, the entire train of operations described will be reversed to decrease the voltage $E_2$ until it equals voltage $E_1$. To effect such a balance there will occur a flow of unbalanced current through coil A in the conventional direction from $E_2$ to $E_1$, to rotate mirror M counterclockwise, thereby to increase the grid voltage of tube $V_1$ in a negative direction and consequently to increase its space path resistance and thereby to reduce current I until voltage $E_2$ again equals voltage $E_1$.

Other factors remaining the same, the voltage $E_1$ thus determines the magnitude to which the photoelectric bridge adjusts the current I, which may thus be altered to any chosen value within limits by alteration in the voltage of the standard $E_1$.

Figure 2:
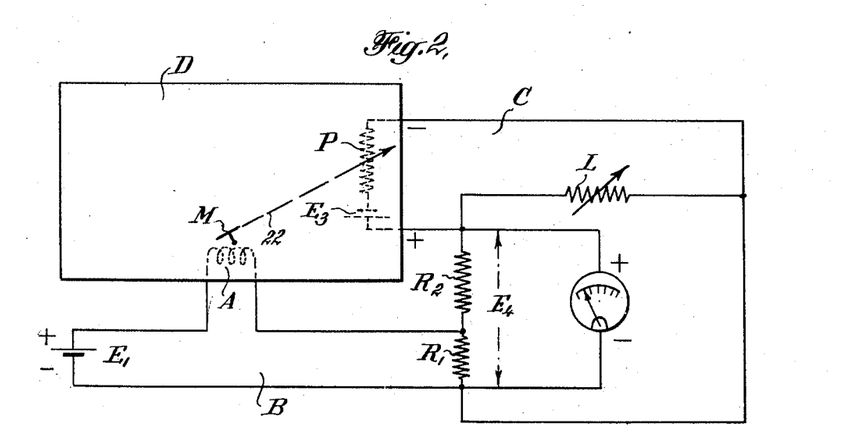
Fig. 2 shows its application to voltage regulation.

Fig. 2 illustrates an extension of the Fig. 1 circuit to provide automatic voltage regulation. The fixed resistance $R_1$ in the balancing circuit B is supplemented by a fixed resistance $R_2$ in the plate circuit C of tube $V_1$ to provide a voltage potentiometer $R_1$, $R_2$ across which the variable load L is connected. The photoelectric bridge is schematically represented by the rectangle D wherein the arrow 22 indicates variation in the plate resistance P of the vacuum tube $V_1$, Fig. 1, in response to deflection of the galvanometer mirror M.

Operation of the system of Fig. 2 to adjust circuit B to a condition of balance in response to a variation in load L is the same as before. In this case, however, regulation is applied to the voltage $E_4$ across load L in contrast to regulation of the load current. When the condition of balance attains the voltage $E_4$ is given by the expression:

$$(2) \qquad E_4 = \left[\frac{R_1 + R_2}{R_1}\right] \cdot E_1$$

inasmuch as the total current is the same in both $R_1$ and $R_2$ and equal to the current $E_1/R_1$ effecting a balance of circuit B.

In the current and voltage regulating systems of Figs. 1 and 2, the controlled factor responds instantly to the compensating adjustments of the photoelectric potentiometer. The temperature control system of Fig. 3 on the other hand, illustrates an application where readjustment of the controlled factor, namely, the temperature, to the chosen standard value of regulation, lags behind the compensating adjustment of the control system effecting the regulation.

Figure 3:
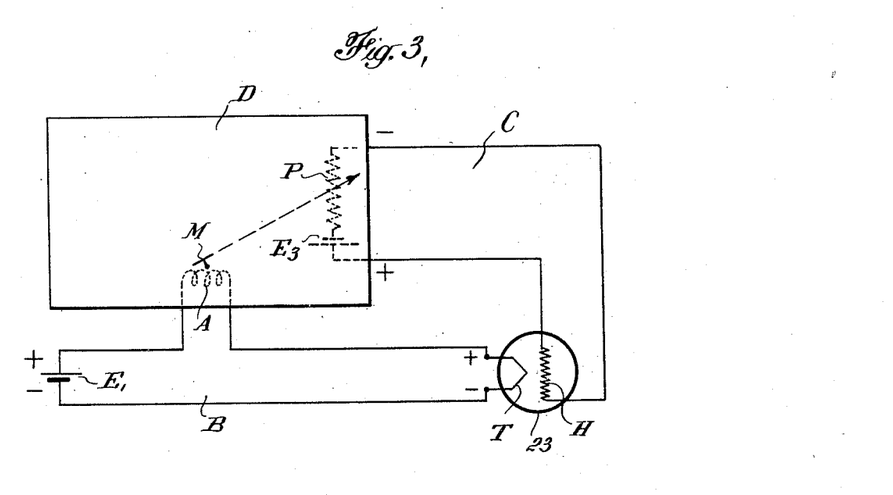
Fig. 3 shows the essentials of a temperature control system in simplified form.

In this case an electrical heating element or resistance H and a thermocouple T, comprising in this case a vacuum thermocouple 23, is so connected to the photoelectric bridge D as to control the temperature of the heater. To this end the heater element is connected in the plate circuit C of tube $V_1$, while the couple T is connected in the balancing circuit B in such polarity as to oppose the voltage of the fixed voltage $E_1$. Balance is therefore established by controlling the current through the heater in accordance with the voltage generated by the thermocouple, and occurs when the current through the heater is of such magnitude as to elevate the couple to a temperature at which its thermally generated voltage equals the fixed voltage $E_1$. The magnitude of the fixed voltage thus determines the standard temperature of regulation.

Assuming the system to be adjusted to a condition of equilibrium, variation of the temperature above or below the standard value determined by voltage $E_1$ at which equilibrium is established, immediately alters the heater current in a direction to restore the standard temperature through the action above described of the photoelectric potentiometer. Alteration of the heater current, however, merely produces an instantaneous change in the caloric output of the heater, following which, as stated, a certain time interval ensues, depending on the thermal capacity of the system, before the changed rate of caloric output can readjust the temperature to standard. Owing to the temperature lag thus introduced the alteration in the heater current, and hence in the caloric output of the heater, will ordinarily be too great, so that the temperature will be transiently overadjusted with respect to that establishing equilibrium, resulting in a damped oscillatory approach thereto.

Figure 4:
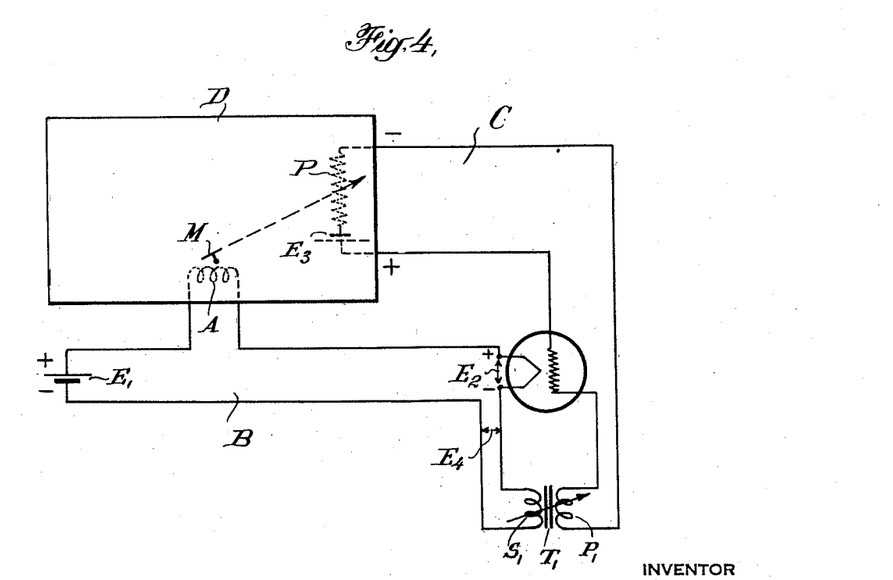
Fig. 4 the addition thereto of the means above referred to for effecting critically damped temperature adjustment.
Figure 5:
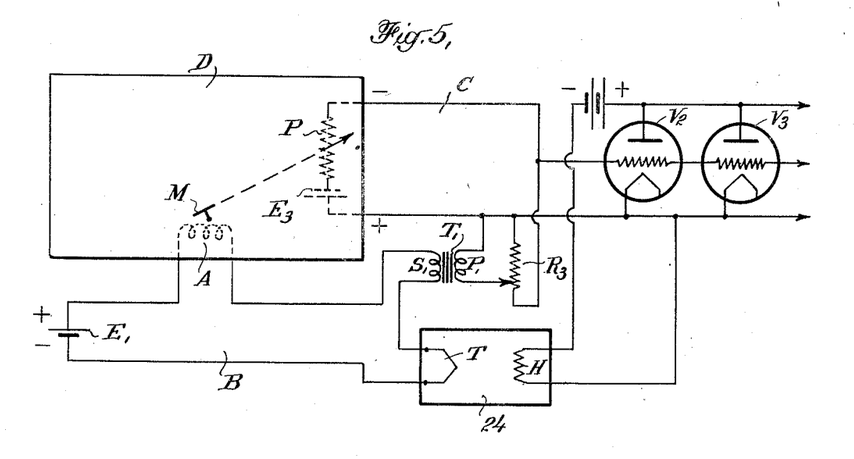
Figs. 5 and 6 show different modifications of the Fig. 3 system for providing increased power output applicable, for example, to the heating and temperature control of ovens, electric furnaces, etc.

This effect may be avoided by employment of a reversed feed back or degenerative transformer coupling between the heater circuit and the balancing circuit, which thus introduces into the balancing circuit a voltage proportional to the rate of change in the heater current and which is so poled as to oppose current changes in the balancing circuit. A coupling of this character is provided by the transformer $T_1$ of Fig. 4 having a primary winding $P_1$ included in the heater circuit C and a separate secondary winding $S_1$ properly poled with respect to the primary and connected in the balancing circuit B. With this arrangement any change in the heater current causes a voltage $E_4$ to be induced in the balancing circuit proportional to the rate of change of the heater current. The voltage $E_4$ is balanced against the voltage difference between the fixed source $E_1$ and the instantaneous voltage $E_2$ of the thermocouple, so that as this difference is reduced to zero, the voltage $E_4$ due to the rate of change of the heater current likewise diminishes to zero leaving the heater current at the proper value to establish equilibrium in the balancing circuit. This therefore is a true logarithmically damped system. The damping may be adjusted to critical damping or otherwise, as desired, by variation of the coupling between the primary and secondary windings of transformer $T_1$.

Where the quantity to be regulated is beyond the range of the photoelectric potentiometer equipped with the single tube $V_1$, as in Fig. 1, this tube may be utilized to control the output of additional tubes in the manner illustrated in the temperature control system of Fig. 5. Here the voltage drop across a fixed resistance $R_3$ included in the plate circuit of tube $V_1$ applies grid voltage to the power tubes $V_2$, $V_3$. For purposes of regulation, the heater element H of an oven or furnace 24 exposed to a thermocouple T, is connected to the output of the power tubes as shown, the couple itself being connected as before in the balancing circuit B. The primary $P_1$ of the feedback transformer $T_1$ is variably tapped to resistance $R_3$ for adjusting the damping of the feedback circuit as desired. The operation of this system is otherwise similar to that of Fig. 4.

In cases where alternating current power can be used, as in the operation of electric furnaces or combustion furnaces having electrically operated valves, blowers or dampers, the power can be regulated by using the photoelectric potentiometer in combination with saturable impedances or various combinations of saturable impedances with thyratrons or vacuum tubes to supply the saturating current.

Figure 6:
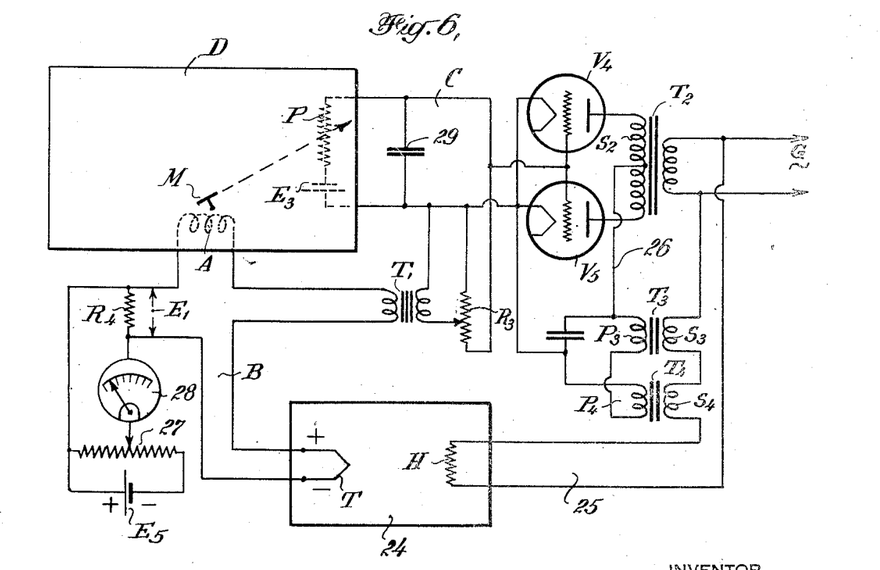

Fig. 6 shows an application of the photoelectric potentiometer to a furnace heated with alternating current wherein regulation is effected by use of saturable impedances. The furnace 24 is supplied with caloric energy by means of a heating element H connected over conductors 25 to a source of alternating current G. For purposes of automatic temperature regulation, the furnace is provided with a thermocouple T connected in the balancing circuit B of the photoelectric potentiometer D. The fixed voltage $E_1$ determinative of the control temperature comprises, in this instance, the voltage drop across a fixed resistance $R_1$ supplied with direct current from a fixed voltage $E_5$ shunted by a potentiometer 27. A meter 28 provides a convenient means of indicating the temperature control setting which is adjustable by the potentiometer.

The plate circuit C of the photoelectric potentiometer contains a resistance $R_3$ bridged across the input to a pair of grid-controlled space discharge rectifiers $V_4$, $V_5$, the space paths of which are energized from alternating current supplied thereto from generator G through a transformer $T_2$, having a secondary winding $S_2$ connected between the rectifier plate electrodes with a mid-tap connection 26 extending to the rectifier cathodes, thereby to provide a full wave rectifier, the rectified current of which flowing in the midtap connection traverses the primary coils $P_3$, $P_4$ of a pair of magnetically saturable impedances $T_3$, $T_4$ having secondary coils $S_3$, $S_4$ in series with the furnace heater element H. Transformer $T_1$ provides a reversed feedback coupling between the plate circuit C of the photoelectric potentiometer and the balancing circuit B. The primary of this transformer is variably tapped to resistance $R_3$ for adjusting the damping. A condenser 29 is bridged across the plate circuit C for by-passing such alternating current as is introduced therein.

In the operation of this system a deviation of the furnace temperature from the control temperature actuates the photoelectric potentiometer to produce a compensating adjustment in the grid voltage impressed on the rectifier tubes. The resulting change in rectified current traversing the impedances $T_3$, $T_4$ by changing the degree of saturation thereof alters the current supplied to the heating element H to the extent necessary to reestablish the control temperature. As with the preceding systems, that of Fig. 6 provides continuous control and a continuously adjustable power supply for purposes of regulation.

In the system of Fig. 6 all delays or time lag entailed in reestablishment of equilibrium following a temperature variation, such as the time required to increase or decrease the magnetic flux in the saturable impedances, are similar in effect to the thermal lag and are additive to it, and as such are inclusively damped by the reverse feedback transformer $T_1$.

The interpretive circuit should be selected to provide maximum sensitivity and reliability for each particular application. For example, in temperature control systems the most appropriate means of interpreting temperature in terms of an equivalent voltage for application to the balancing circuit of the photoelectric potentiometer, is dependent on the temperature range of operation as well as on conditions of mechanical expediency. Thus, for controlling the temperature of a furnace or the like, the thermocouple of Figs. 3–6 inclusive is usually adequate. For certain applications, however, the optical pyrometer or the total radiation pyrometer is to be preferred. For controlling temperature in lower temperature ranges, the resistance thermometer is generally best because it is the most precise of the indicators capable of interpreting temperature electrically.

Figure 7:
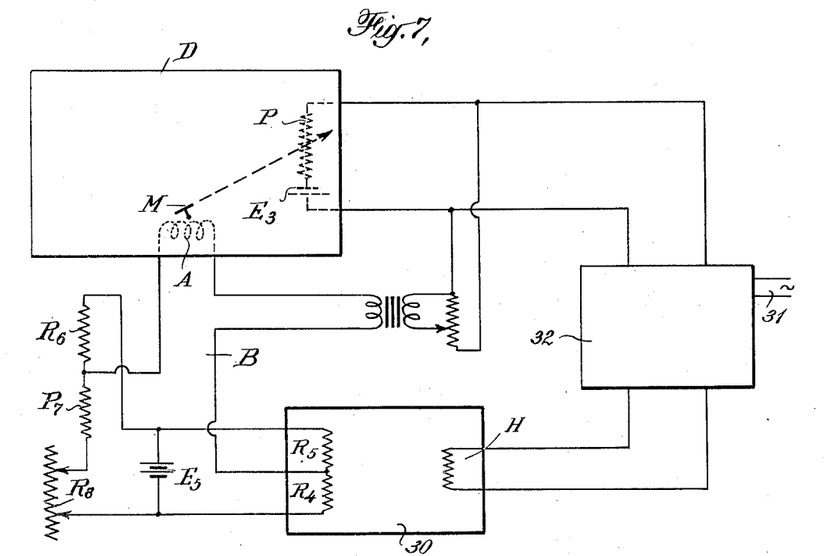
Fig. 7 shows a temperature control system generally similar to Fig. 3 wherein the thermocouple is replaced by a resistance thermometer; and in Fig. 8 by a photocell responsive to the luminous energy of a furnace.

Fig. 7 illustrates an application of the resistance thermometer to the photoelectric potentiometer for purposes of temperature control. The resistance thermometer comprises the serially connected resistances $R_4$ to $R_8$ inclusive, forming the balancing arms of an electrical bridge, energized from a battery $E_5$ bridged between one pair of conjugate points, with the galvanometer coil A of the photoelectric potentiometer D bridged between the other pair of conjugate points. Resistor $R_4$ has a high temperature coefficient, whereas resistors $R_5$ to $R_8$ inclusive, have substantially zero temperature coefficient. Resistor $R_4$ is exposed to the temperature to be regulated, such as the temperature of an oven 30 heated by means of an electrical resistance H energized from a source of power 31 regulated by the photoelectric potentiometer, for example, in accordance with the system of Fig. 6, the power regulating equipment being indicated diagrammatically by the rectangle 32.

Resistance $R_8$ is adjustable for the purpose of balancing the bridge at the control temperature. Thereafter any deviation of the temperature unbalances the bridge by variation in resistance $R_4$, to produce a flow of current in the galvanometer winding A of proper magnitude and polarity to restore the control temperature through the operation of the photoelectric potentiometer and the power control unit 32.

Figure 8:
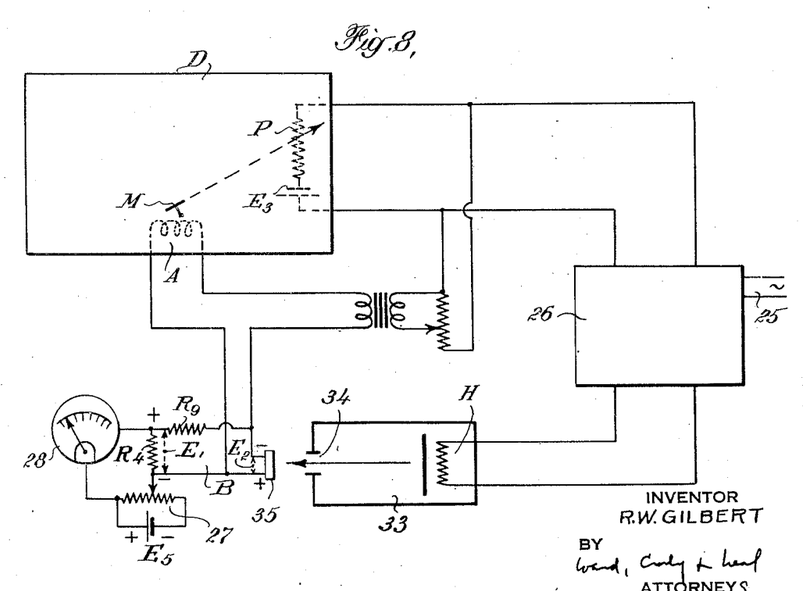

Fig. 8 shows an adaptation of the photoelectric potentiometer to temperature control by employment of a photocell having a low internal resistance as the interpretive element. In this circuit a furnace 33, the temperature of which is to be regulated, is provided with an aperture 34 through which radiant energy is incident on a photocell 35 adapted to convert luminous energy directly into electrical current energy. Since the photocell has low internal resistance, optimum operation is secured by utilization of its substantially short-circuited current output in contrast to its open circuit voltage to achieve equilibrium in the balancing circuit B of the photoelectric potentiometer. This entails a slight modification in the balancing circuit arrangement to provide a current balance in contrast to the circuits previously described which operate on the principle of balancing opposed voltages.

Thus, with the current balancing arrangement of Fig. 8, the galvanometer coil A is connected in shunt to the photo-cell, while the voltage drop $E_1$ across resistance $R_4$ supplies current to coil A through a series resistance $R_8$. Voltage $E_1$ is poled to aid the voltage $E_2$ of the photocell in the balancing circuit. The circuit therefore adjusts itself to balance with no current flowing in the galvanometer coil, which is equivalent to short-circuiting the output of the photocell.

Figure 9:
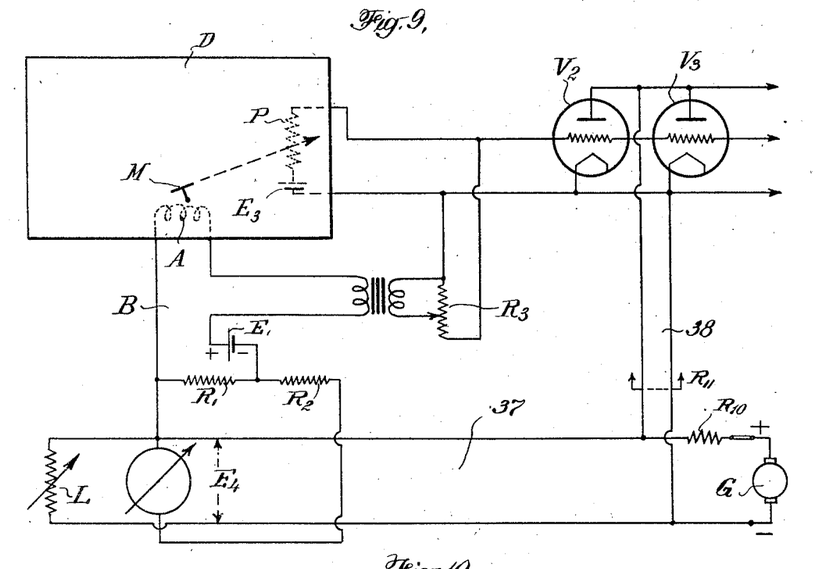
Figs. 9 and 10 are, respectively, current and voltage regulating systems applicable where the power thus controlled is relatively large.

Fig. 9 shows an arrangement wherein the photoelectric potentiometer D controls power tubes $V_2$, $V_3$ in the manner explained with reference to Fig. 5, for effecting voltage regulation where relatively large amounts of power are involved. A generator G supplies a variable load L through a resistance $R_{10}$ and over conductors 37. The plate circuits of tubes $V_2$, $V_3$ in parallel, are bridged by means of conductors 38 across the load L.

In the operation of this system, a deviation in the load resistance L from the value establishing equilibrium will, through the control action of the photoelectric potentiometer, produce an opposite and compensating variation in the plate circuit resistance, indicated by $R_{11}$, of tubes $V_2$, $V_2$. Thus, if load L decreases, the increased current flow through resistance $R_{10}$ will reduce voltage $E_4$ and thereby destroy equilibrium in the balancing circuit B. The resulting current flow therein will produce an increase of resistance $R_{11}$ such as to restore the flow of current through resistance $R_{10}$ to its initial value, thereby to restore voltage $E_4$ to the value establishing equilibrium in the manner explained with reference to Fig. 2.

The circuit of Fig. 9 could be adapted to current regulation by omitting resistance $R_2$ and connecting resistance $R_1$ in series with load L and resistance $R_{10}$, balance then being achieved in the manner explained with reference to Fig. 1.

Figure 10:
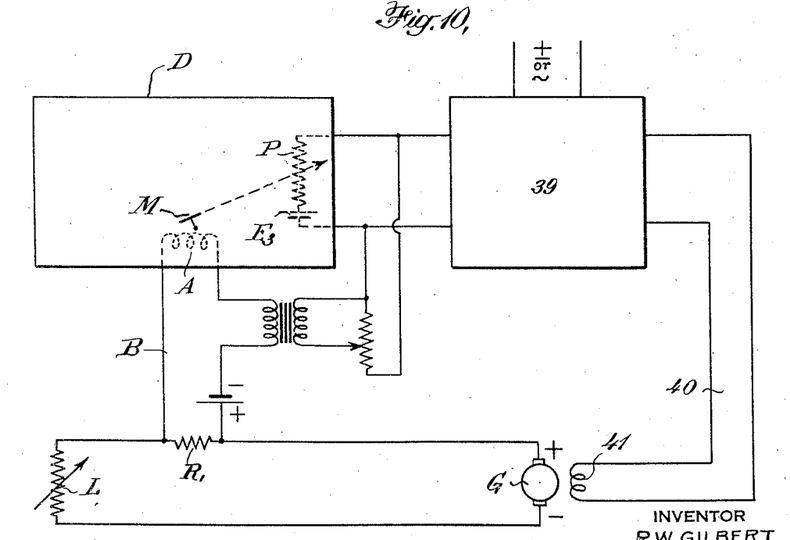

Fig. 10 illustrates how current regulation may be secured by variation in the field current of a generator G. The photoelectric potentiometer may be employed to adjust power control equipment indicated by rectangle 39, which, for example, may be in accordance with the rectifier tube $V_2$, $V_3$ arrangement of Fig. 5, or the rectifier tube $V_4$, $V_5$ arrangement of Fig. 6, supplying current over conductors 40 to the field winding 41 of generator G.

Operation of the system is such that upon deviation of the load resistance L from the value establishing equilibrium, the field strength of the generator is either increased or decreased as required to restore the load current to its initial value. Adaptation of this circuit to voltage regulation is obvious from Figs. 1 and 2.

Figure 11:
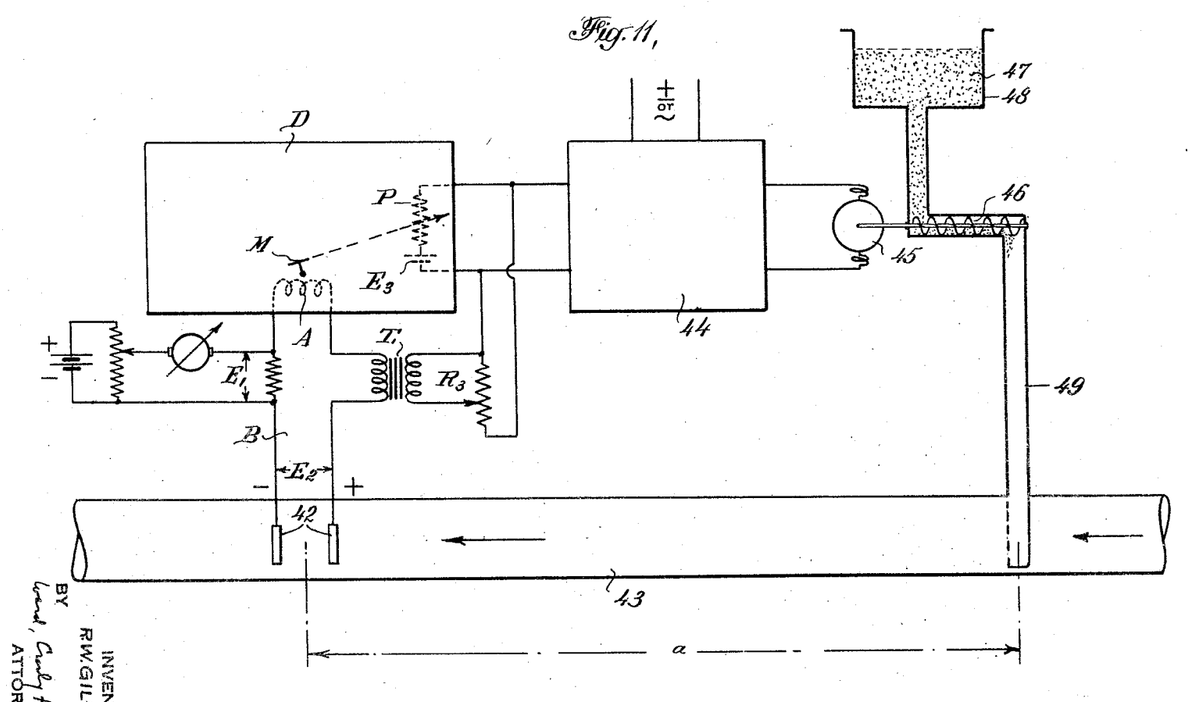
Fig. 11 is an adaptation of the invention to controlling the hydrogen ion concentration in a chemical system, in this instance the pH of a water supply system.

Fig. 11 illustrates an application of the photoelectric potentiometer for regulating the pH value of a solution, in this case that of a water supply main. A pair of electrochemically dissimilar electrodes 42, such as a quinhydrone electrode and a platinum electrode, are immersed in the solution flowing in a pipe line 43, to form a primary cell generating a voltage $E_2$, the magnitude of which is determined by the pH. Electrodes 42 are connected in the balancing circuit B as shown, so that the generated voltage $E_2$ is opposed to the standard voltage $E_1$ for determining the equilibrium condition. The photoelectric potentiometer D regulates through power control equipment 44, such as that of Figs. 5 and 6, the field strength of a motor 45, which drives a screw feed 46, feeding a neutralizing chemical 47 from a reservoir 48 into pipe line 43 through the auxiliary pipe 49. Pipe 49 is spaced from electrode 42 by a sufficient distance $a$ to assure that at the measuring point the added chemical will be thoroughly dissolved and uniformly distributed throughout the solute.

In this system, the speed at which motor 45 operates determines the rate at which the neutralizing agent is fed to the pipe line, the motor speed in turn being governed by the pH value at the electrodes 42. Should its value fluctuate above or below that desired, the resulting flow of current in the balancing circuit will speed up or slow down motor 45 as required, to restore the pH to the chosen standard.

Under some circumstances of control, the interpretive system is continually subject to fluctuations above and below the true condition. For such conditions ideal control is secured only by following these fluctuations with a speed proportionate to their deviations and for as long as they persist. The result of such action is an integration of the fluctuations and a constant tendency toward balance resulting in the best possible control under the conditions prevailing.

A notable example of this situation is the continuous control of pH in a pipe line, such as that of Fig. 11. Agitation is naturally more or less incomplete resulting in fluctuating concentration at the electrodes and hence erratic interpretation. However, electrode response is linear and, with properly placed electrodes, an integrated value closely represents the true condition existing if agitation were complete.

In this case, no definite lag is encountered such as occurs with temperature change, but the damping $T_1$, $R_3$, Fig. 11, can be usefully employed nevertheless to integrate the fluctuations to the extent of establishing an equilibrium condition representative of the average of the fluctuations.

I claim:

1. Automatic regulating apparatus comprising: an electrically interpretable variable quantity to be regulated, a grid-controlled space discharge device having an output circuit traversed by space current of said device, means for applying a variable biasing potential to said grid, means responsive to and in accordance with the magnitude of said space current for varying said quantity by continuous gradations, a balancing circuit containing a fixed electrical component determinative of a chosen value of regulation and a similar component electrically interpretive of said quantity, and means including a photoelectrically controlled electrical bridge responding in magnitude and polarity to unbalanced current flow in said circuit due to deviation of said quantity from said chosen value for compensatively altering said biasing potential to adjust said quantity to said chosen value and concurrently to adjust said circuit to a condition of balance in continuous and mutually controlling gradations, said bridge having as a pair of balancing arms the current paths respectively of a pair of photoelectric elements.

2. In an energy conversion system, apparatus for automatically regulating to a chosen value a component thereof subject to variation, comprising: a grid-controlled space discharge device having an output circuit traversed by space current of said device, means for applying a variable biasing potential to said grid, energy supply means responsive to and varying in output in accordance with the magnitude of said space current by continuous gradations for establishing said component at said chosen value, a balancing circuit containing a fixed electrical quantity determinative of said chosen value and a similar quantity electrically interpretive of said energy component, and means including a photoelectrically controlled electrical bridge, responding in magnitude and polarity to unbalanced current flow in said balancing circuit due to deviation of said energy component from said chosen value for compensatively altering said biasing potential and thereby the output of said energy supply means to adjust said energy component to said chosen value and concurrently to adjust said circuit to a condition of balance in continuous and mutually controlling gradations, said bridge having as a pair of balancing arms the current paths respectively of a pair of photoelectric elements.

3. In an energy conversion system, apparatus for automatically regulating to a chosen value an energy component subject to variation, comprising: an electrical bridge having as a pair of balancing arms the current paths respectively of a pair of photoelectric elements and as a conjugate arm the input to a grid-controlled space discharge device, an output circuit traversed by space current of said device, means responsive to and in accordance with the magnitude of said space current for varying said energy component by continuous gradations, a balancing circuit containing a fixed electrical component determinative of said chosen value and a similar component electrically interpretive of said energy component, means for illuminating said photoelectric elements, means responsive in magnitude and polarity to unbalanced current flow in said balancing circuit due to deviation of said energy component from said chosen value for oppositely varying the illumination of said photoelectric elements thereby to correspondingly vary the space current of said discharge device, thereby to adjust said energy component to said chosen value and concurrently to adjust said circuit to a condition of balance in continuous and mutually controlling gradations.

4. A temperature control system, comprising: a grid-controlled space discharge device having an output circuit traversed by space current of said device, means for applying a variable biasing potential to said grid, a source of heat responsive to and varying in caloric output in accordance with the magnitude of said space current by continuous gradations for establishing a localized temperature at a chosen value, a balancing circuit containing a fixed electrical component determinative of said chosen value and a similar component for interpreting said temperature electrically, and means including a photoelectrically controlled electrical bridge responding in magnitude and polarity to unbalanced current flow in said balancing circuit due to deviation of said temperature from said chosen value for compensatively altering said grid biasing potential and thereby said caloric energy output to adjust said temperature to the chosen value and concurrently to adjust said balancing circuit to a condition of balance in continuous and mutually controlling gradations.

5. A temperature control system, comprising: an electrical bridge having as a pair of balancing arms the current paths respectively of a pair of photoelectric elements and as a conjugate arm the input to a grid-controlled space discharge device, an output circuit traversed by space current of said device, a source of heat responsive to and varying in caloric output by continuous gradations in accordance with the magnitude of said space current, a balancing circuit containing a fixed electrical component determinative of said chosen value and a similar component for interpreting said temperature electrically, means for illuminating said photoelectric elements, means responding in magnitude and polarity to unbalanced current flow in said circuit due to deviation of said temperature from said chosen value for oppositely varying the illumination of said photoelectric elements thereby to correspondingly vary the space current of said discharge device and thereby said caloric output to adjust said temperature to said chosen value and concurrently to adjust said circuit to a condition of balance in continuous and mutually controlling gradations.

6. A continuously adjustable automatic voltage regulator for direct current systems, comprising: a resistance, a load circuit subject to variation bridged across said resistance, a source of voltage for supplying current to said resistance and load circuit means including a grid-controlled space discharge device and a source of variable grid biasing voltage therefor, for adjusting the magnitude of said current in response to adjustment of said biasing voltage, a balancing circuit bridged across at least a portion of said resistance, said circuit containing a fixed voltage poled in opposition to the voltage drop across said resistance, whereby said circuit is balanced for a certain current in said resistance and hence for a certain voltage across said load, and means responding in magnitude and polarity to unbalanced current flow in said circuit for varying said biasing voltage to adjust the current in said resistance to said certain value, thereby to balance said circuit and to adjust said load voltage to said certain value.

7. An automatic voltage regulator for direct current systems, comprising: an electrical bridge having as a pair of balancing arms the current paths respectively of a pair of photoelectric elements, and as a conjugate arm the input to a grid-controlled space discharge device, a resistance, a load circuit bridged across said resistance, voltage means for energizing said bridge and for supplying current to said resistance and to said load circuit, a balancing circuit bridged across at least a portion of said resistance, said circuit containing a fixed voltage poled in opposition to the voltage drop across said resistance, whereby said circuit is balanced for a certain current in said resistance and hence for a certain voltage across said load, means for illuminating said photoelectric elements, and galvanometric means responsive in magnitude and polarity to unbalanced current flow in said circuit for oppositely varying the illumination of said photoelectric elements and thereby the grid voltage applied to said discharge device, and means responsive to said discharge device to adjust the current in said resistance to said certain value, thereby to balance said circuit and adjust said load voltage to said certain value.

8. An automatic current regulator for direct current systems, comprising: a load circuit containing in series connection, a fixed resistance, a load resistance subject to variation, and a voltage source, a balancing circuit bridged across said fixed resistance, said circuit containing a fixed voltage poled in opposition to the voltage drop across said resistance, whereby said circuit is balanced for a certain current in said load circuit, and means including an element in said balancing circuit and a grid-controlled space discharge device, responsive in magnitude and polarity to unbalanced current flow in said balancing circuit for altering the current in said load circuit, automatically to adjust the load current to said certain value and hence to establish a condition of balance in said balancing circuit.

9. An automatic current regulator for direct current systems, comprising: an electrical bridge having as a pair of balancing arms the current paths respectively of a pair of photoelectric elements and as a conjugate arm the input to a grid-controlled space discharge device, a load circuit containing in series connection, a fixed resistance, a load resistance subject to variation, and a voltage source, a balancing circuit bridged across said fixed resistance, said circuit containing a fixed voltage poled in opposition to the voltage drop across said resistance whereby said circuit is balanced for a certain current in said fixed resistance and hence for a certain current in said load resistance, means for illuminating said photoelectric elements and galvanometric means responsive in magnitude and polarity to unbalanced current flow in said circuit for oppositely varying the illumination of said photoelectric elements and thereby the grid voltage applied to said discharge device, and means responsive to said discharge device to adjust the load current to said certain value and hence to balance said circuit.

10. Apparatus for automatically regulating to a chosen value, the ionic concentration of a solution, comprising: a grid-controlled space discharge device having an output circuit traversed by space current of said device, means for applying a variable biasing potential to said grid, means responsive to and continuously adjustable in accordance with the magnitude of said space current, for varying said concentration, a pair of spaced electrochemically dissimilar electrodes exposed to said solution for generating a voltage indicative of said concentration, said voltage being poled in opposition in a balancing circuit to a fixed voltage determinative of said chosen value, means responsive in magnitude and polarity to unbalanced current flow in said circuit due to deviation of said concentration from said chosen value for compensatively altering said grid biasing voltage and thereby said ionic concentration to adjust the same to said chosen value and concurrently to adjust said circuit to a condition of balance in continuous and mutually controlling gradations.

11. Apparatus for automatically regulating to a chosen value, the ionic concentration of a solution, comprising: a grid-controlled space discharge device having an output circuit traversed by space current of said device, means for applying a variable biasing potential to said grid, means responsive to and continuously adjustable in accordance with the magnitude of said space current for varying said concentration, a pair of spaced electrochemically dissimilar electrodes exposed to said solution for generating a voltage indicative of said concentration, said voltage being poled in opposition in a balancing circuit to a fixed voltage determinative of said chosen value, means including a photoelectric potentiometer responsive in magnitude and polarity to unbalanced current flow in said circuit due to deviation of said concentration from said chosen value for compensatively altering said grid biasing voltage thereby to adjust said ionic concentration to said chosen value and concurrently to adjust said circuit to a condition of balance in continuous and mutually controlling gradations.

12. Automatic regulating apparatus, comprising: an electrically interpretable variable quantity to be regulated; a grid controlled space discharge device having an output circuit traversed by space current thereof; continuously variable means responsive to and in accordance with the magnitude of said space current for varying said quantity by continuous gradations; means including a galvanometer having a freely supported movable element for applying to the grid of said space discharge device, a biasing potential which is continuously variable in accordance with movement of, and the magnitude of which is determined by the position of, said movable element; a balancing circuit containing a fixed electrical component determinative of a chosen value of regulation, and a similar component electrically interpretive of said quantity, said galvanometer being included in said balancing circuit and thereby responding to unbalanced current flow therein due to deviation of said quantity from said chosen value for automatically and compensatively altering said biasing potential to adjust said quantity to said chosen value and concurrently to adjust said balancing circuit to a condition of balance in continuously variable and mutually controlling gradations.

13. Automatic regulating apparatus, comprising: an electrically interpretable variable quantity to be regulated; a grid controlled space discharge device having an output circuit traversed by space current thereof; continuously variable means responsive to and in accordance with the magnitude of said space current for varying said quantity by continuous gradations; means including a galvanometer having a freely supported movable element for applying to the grid of said space discharge device, a biasing potential which is continuously variable in accordance with movement of, and the magnitude of which is determined by the position of, said movable element; a balancing circuit containing a fixed electrical component determinative of a chosen value of regulation, and a similar component electrically interpretive of said quantity, said galvanometer being included in said balancing circuit and thereby responding to unbalanced current flow therein due to deviation of said quantity from said chosen value for automatically and compensatively altering said biasing potential to adjust said quantity to said chosen value and concurrently to adjust said balancing circuit to a condition of balance in continuously variable and mutually controlling gradations; and electrical impedance means coupling the output of said space discharge device with said balancing circuit for causing said adjustments to occur at a continuously decreasing rate with approach of said quantity to said chosen value whereby transient overadjustments of said quantity are substantially prevented.

14. Automatic regulating apparatus, comprising: an electrically interpretable variable quantity to be regulated; a grid controlled space discharge device having an output circuit traversed by space current thereof; continuously variable means responsive to and in accordance with the magnitude of said space current for varying said quantity by continuous gradations; means including a galvanometer having a freely supported movable element for applying to the grid of said space discharge device, a biasing potential which is continuously variable in accordance with movement of, and the magnitude of which is determined by the position of, said movable element; a balancing circuit containing a fixed electrical component determinative of a chosen value of regulation, and a similar component electrically interpretive of said quantity, said galvanometer being included in said balancing circuit and thereby responding to unbalanced current flow therein due to deviation of said quantity from said chosen value for automatically and compensatively altering said biasing potential to adjust said quantity to said chosen value and concurrently to adjust said balancing circuit to a condition of balance in continuously variable and mutually controlling gradations; and means including a transformer coupling the output of said space discharge device with said balancing circuit for causing said adjustments to occur at a continuously decreasing rate with approach of said quantity to said chosen value, whereby transient over-adjustments of said quantity are substantially prevented.

15. In an energy conversion system, apparatus for automatically regulating to a chosen value an energy component subject to variation, comprising: a grid controlled space discharge device having an output circuit traversed by space current thereof; continuously variable energy supply means responsive to and in accordance with the magnitude of said space current for varying the rate of said energy supply by continuous gradations; means including a galvanometer having a freely supported movable element for applying to the grid of said space discharge device, a biasing potential which is continuously variable in accordance with movement of, and the magnitude of which is determined by the position of said movable element; a balancing circuit containing a fixed electrical component determinative of said chosen value and a similar component electrically interpretive of said energy component, said galvanometer being included in said balancing circuit and thereby responding to unbalanced current flow therein due to deviation of said energy component from said chosen value, for automatically and compensatively altering said biasing potential to adjust said energy component to said chosen value and concurrently to adjust said circuit to a condition of balance in continuously variable and mutually controlling gradations.

16. In an energy conversion system, apparatus for automatically regulating to a chosen value an energy component subject to variation, comprising: a grid controlled space discharge device having an output circuit traversed by space current thereof; continuously variable energy supply means responsive to and in accordance with the magnitude of said space current for varying the rate of said energy supply by continuous gradations; means including a galvanometer having a freely supported movable element for applying to the grid of said space discharge device, a biasing potential which is continuously variable in accordance with movement of, and the magnitude of which is determined by the position of, said movable element; a balancing circuit containing a fixed electrical component determinative of said chosen value and a similar component electrically interpretive of said energy component, said galvanometer being included in said balancing circuit and thereby responding to unbalanced current flow therein due to deviation of said energy component from said chosen value, for automatically and compensatively altering said biasing potential to adjust said energy component to said chosen value and concurrently to adjust said circuit to a condition of balance in continuously variable and mutually controlling gradations; and electrical impedance means coupling the output of said space discharge device with said balancing circuit for causing said adjustments to occur at a continuously decreasing rate with approach of said energy component to said chosen value, whereby transient over-adjustments of said energy component are substantially prevented.

17. An automatic temperature control system, comprising: a grid controlled space discharge device having an output traversed by space current thereof; a source of heat, continuously variable in caloric output, responsive to and in accordance with the magnitude of said space current for establishing a temperature at a chosen value; means including a galvanometer having a freely supported movable element for applying to the grid of said space discharge device a biasing potential which is continuously variable in accordance with movement of, and the magnitude of which is determined by the position of, said movable element; a balancing circuit containing a fixed electrical component determinative of said chosen value and a similar component electrically interpretive of said temperature, said galvanometer being included in said balancing circuit and thereby responding to unbalanced current flow therein due to deviation of said temperature from said chosen value for automatically and compensatively altering said biasing potential to adjust said temperature to said chosen value and concurrently to adjust said balancing circuit to a condition of balance in continuously variable and mutually controlling gradations.

18. An automatic temperature control system, comprising: a grid controlled space discharge device having an output traversed by space current thereof; a source of heat, continuously variable in caloric output, responsive to and in accordance with the magnitude of said space current for establishing a temperature at a chosen value; means including a galvanometer having a freely supported movable element for applying to the grid of said space discharge device, a biasing potential which is continuously variable in accordance with movement of, and the magnitude of which is determined by the position of, said movable element; a balancing circuit containing a fixed electrical component determinative of said chosen value and a similar component electrically interpretive of said temperature, said galvanometer being included in said balancing circuit and thereby responding to unbalanced current flow therein due to deviation of said temperature from said chosen value for automatically and compensatively altering said biasing potential to adjust said temperature to said chosen value and concurrently to adjust said balancing circuit to a condition of balance in continuously variable and mutually controlling gradations; and electrical impedance means coupling the output of said space discharge device with said balancing circuit for causing said adjustments to occur at a continuously decreasing rate with approach of said temperature to said chosen value whereby transient over-adjustments of said temperature are substantially prevented.

19. An automatic temperature control system, comprising: a grid controlled space discharge device having an output traversed by space current thereof; a source of heat, continuously variable in caloric output, responsive to and in accordance with the magnitude of said space current for establishing a temperature at a chosen value; means including a galvanometer having a freely supported movable element for applying to the grid of said space discharge device, a biasing potential which is continuously variable in accordance with movement of, and the magnitude of which is determined by the position of, said movable element; a balancing circuit containing a fixed electrical component determinative of said chosen value and a similar component electrically interpretive of said temperature, said galvanometer being included in said balancing circuit and thereby responding to unbalanced current flow therein due to deviation of said temperature from said chosen value for automatically and compensatively altering said biasing potential to adjust said temperature to said chosen value and concurrently to adjust said balancing circuit to a condition of balance in continuously variable and mutually controlling gradations; and means including a transformer coupling the output of said space discharge device with said balancing circuit for causing said adjustments to occur at a continuously decreasing rate with approach of said temperature to said chosen value whereby transient over-adjustments of said temperature are substantially prevented.

ROSWELL WARD GILBERT.